(12) United States Patent
Sasaki (10) Patent No.: US 9,338,343 B2
(45) Date of Patent: May 10, 2016

(54) IMAGING APPARATUS AND METHOD FOR CONTROLLING SAME

(71) Applicant: CANON KABUSHIKI KAISHA, Tokyo (JP)

(72) Inventor: Kenichi Sasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 14/227,358

(22) Filed: Mar. 27, 2014

(65) Prior Publication Data

US 2014/0300800 A1    Oct. 9, 2014

(30) Foreign Application Priority Data

Apr. 5, 2013    (JP) .................................. 2013-079064

(51) Int. Cl.
*H04N 5/232*    (2006.01)

(52) U.S. Cl.
CPC .................................. *H04N 5/23212* (2013.01)

(58) Field of Classification Search
CPC .................. H04N 5/23212; G03B 2205/00
See application file for complete search history.

(56) References Cited

U.S. PATENT DOCUMENTS

| 5,168,298 | A | * | 12/1992 | Hirai | ......................... | G02B 7/28 396/121 |
| 8,363,153 | B2 | * | 1/2013 | Tsukada | .................. | G02B 7/36 348/349 |

* cited by examiner

*Primary Examiner* — Ahmed A Berhan
(74) *Attorney, Agent, or Firm* — Cowan, Liebowitz & Latman, P.C.

(57) ABSTRACT

Provided is an imaging apparatus that acquires an object distance to an object and focus position information for each of a plurality of divided areas of an imaging screen corresponding to an imaging area. The imaging apparatus acquires data of the amount of field curvature corresponding to the imaging distance and removes a field curvature component from the object distance and the defocus amount so as to determine a plurality of objects which is equi-spaced from the imaging apparatus and faces the imaging apparatus. When the plurality of objects is equi-spaced from the imaging apparatus and is arrayed so as to face the imaging apparatus, a focused position at which an error in the defocus amount on the entire imaging screen is minimized is calculated. If otherwise, a focusing reference area is selected and then a preferential focusing operation is performed for an object corresponding to the area.

12 Claims, 8 Drawing Sheets

IMAGING APPARATUS AND METHOD FOR CONTROLLING SAME

BACKGROUND OF THE INVENTION

1. Field of the Invention

The present invention relates to an autofocus adjustment technique of an imaging apparatus having an imaging optical system that varies an amount of field curvature depending on an imaging distance.

2. Description of the Related Art

In recent years, suppression of residual aberrations in optical design of image-taking lenses has become more difficult in imaging apparatuses such as compact digital cameras as a result of the requirements for miniaturization, thinning, high magnification of zoom lenses, and the like. In general, a variation in aberrations occurs in imaging optical systems if image-taking conditions such as the distance to an object or the like change, resulting in a change in performance. Thus, a balanced design is provided such that the variation in aberrations falls within a predetermined range. For example, zoom lenses are designed in consideration of sufficient correction of aberrations at all imaging distances which are assumed to be used.

On the other hand, there is a tradeoff relationship between the degree of freedom in design and specification such as size, brightness, zoom magnification, and the like of imaging optical systems or degree of aberration correction. An increase in the degree of freedom in design is not readily achieved due to limitations such as design specification, the number or thickness of lenses, opening diameter, selection of glass materials, and the like. For example, among the aberrations to be corrected, field curvature varies depending on an imaging distance. If miniaturization of apparatuses advances, the remaining amount of aberration may not be negligible. An image may be affected in a macro imaging area due to the readily occurrence of field curvature toward the under direction upon image-taking at close-range distance. A field curvature may locally be increased at a specific middle zoom position as a matter of design. Furthermore, field curvature toward the over direction may occur on the telescopic side.

In the conventional imaging apparatuses, an image needs to be taken in an optimum focused state for various types of objects by mitigating the effect of axially asymmetric deformation of an image plane due to a variation in distance of field curvature components in terms of lens design and manufacturing error of lenses. In other words, image plane-related error components need to be removed upon acquiring distance information to a plurality of objects. Array determination or facing determination of the respective objects using distance information including error components may cause a trouble for image capture in an optimum focused state.

SUMMARY OF THE INVENTION

The present invention provides an imaging apparatus that determines the array state of a plurality of objects by removing the effect of field curvature from object distance information so as to perform focus adjustment depending on the determination result.

According to an aspect of the present invention, an imaging apparatus using an imaging optical system having an amount of field curvature depending on an imaging distance is provided that includes a focus lens and its driving unit configured to constitute the imaging optical system; an imaging unit configured to image an object via the imaging optical system; a storing unit configured to store data of the amount of field curvature corresponding to the imaging distance; a calculating unit configured to calculate distance information to an object for each of a plurality of divided areas of an imaging screen corresponding to the imaging area of the imaging unit; and a control unit configured to acquire data of the amount of field curvature corresponding to the imaging distance from the storing unit, remove the data from distance information acquired from the calculating unit, correct distance information to an object for each of the divided areas and determine a focused state based on a defocus amount to thereby cause the driving unit to control the movement of the focus lens. The control unit performs first control that controls movement of the focus lens by calculating a focused position from the defocus amount calculated for each of the divided areas when a plurality of objects is in an array state in which the difference in distances between the plurality of objects respectively corresponding to the divided areas and the imaging apparatus is equal to or less than a threshold value, whereas the control unit performs second control that controls movement of the focus lens by calculating a focused position from the defocus amount calculated for an area selected from the divided areas when the plurality of objects respectively corresponding to the divided areas is not in the array state.

According to the present invention, an imaging apparatus that determines the array state of a plurality of objects by removing the effect of field curvature from object distance information so as to perform focus adjustment depending on the determination result may be provided.

Further features of the present invention will become apparent from the following description of exemplary embodiments with reference to the attached drawings.

DESCRIPTION OF THE EMBODIMENTS

Figure 1:
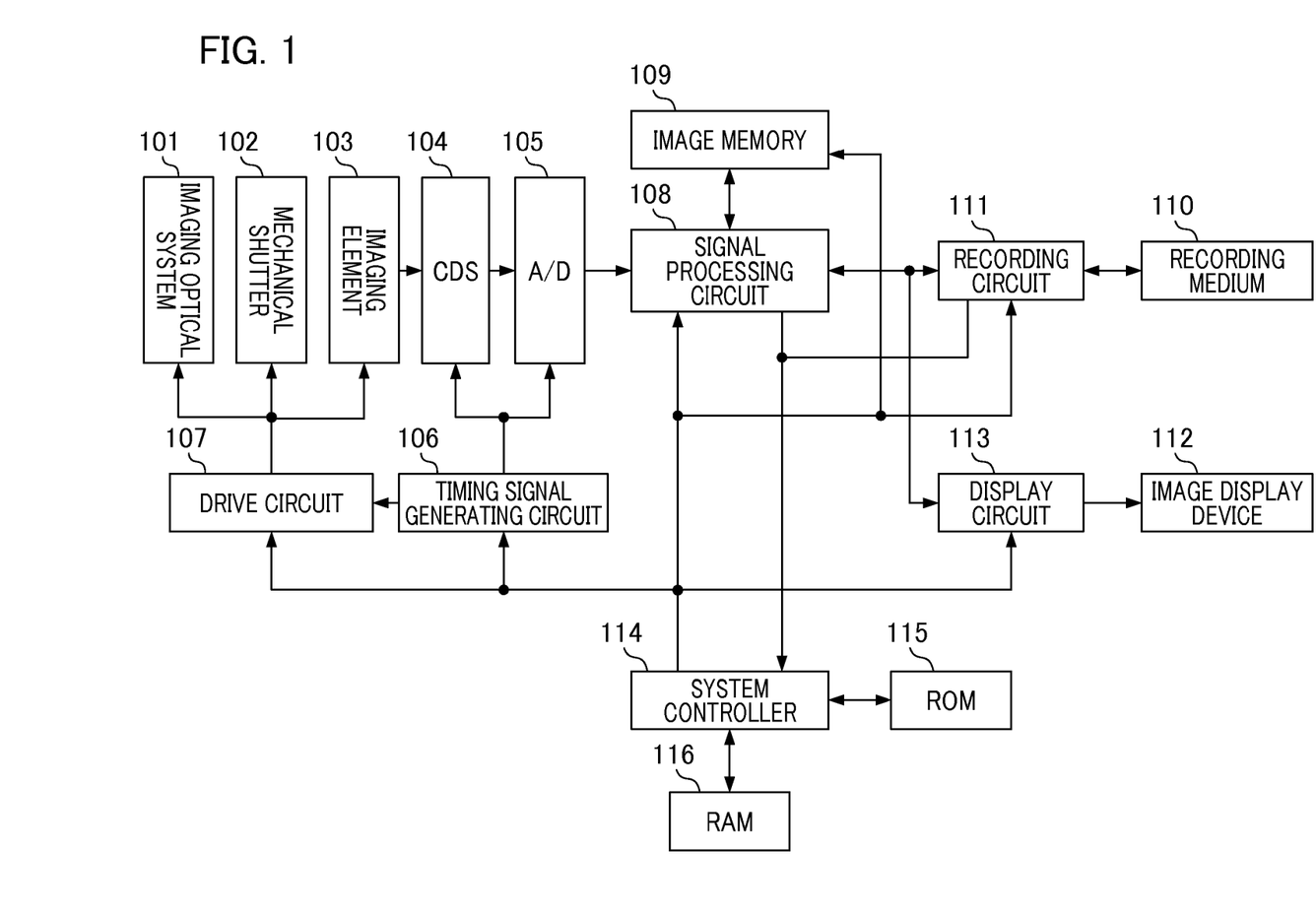
FIG. 1 is a block diagram illustrating an exemplary configuration of an imaging apparatus according to one embodiment of the present invention.

Hereinafter, preferred embodiments of the present invention will be described with reference to the drawings. Prior to the detailed description of the present invention, a description will be given of an imaging apparatus having a configuration which is common to imaging apparatuses according to the embodiments of the present invention. The imaging apparatus is so-called an electronic camera such as a digital camera. FIG. 1 is a block diagram illustrating an exemplary configuration of an imaging apparatus.

An imaging optical system 101 includes a lens group and an aperture. A mechanical shutter 102 is used for controlling exposure of an imaging element 103. The imaging element 103 is an image sensor using a CCD (Charge Coupled Device), a CMOS (Complementary Metal-Oxide Semiconductor), or the like. A CDS (Correlation Double Sampling) circuit 104 performs analog signal processing for the output of the imaging element 103. An A/D converter 105 converts analog signals into digital signals. A timing signal generating circuit 106 generates a signal for operating the imaging element 103, the CDS circuit 104, and the A/D converter 105. A drive circuit 107 drives the imaging optical system 101, the mechanical shutter 102, and the imaging element 103. A signal processing circuit 108 performs signal processing required for data of a captured image. An image memory 109 stores image data subjected to signal processing. The imaging apparatus is provided with a removable recording medium 110. A recording circuit 111 records image data subjected to signal processing on the recording medium 110. An image display device 112 displays an image in accordance with image data subjected to signal processing. A display circuit 113 controls to display an image on the image display device 112.

A system controller 114 includes a CPU (Central Processing Unit) and controls the entire imaging apparatus. A non-volatile memory (ROM) 115 stores a program describing the control procedure to be executed by the system controller 114. In addition, control data such as parameters, tables, and the like to be used upon execution of a program by CPU and various types of correction data are stored in the non-volatile memory 115. A volatile memory (RAM) 116 stores program, control data, and correction data, which are stored in the non-volatile memory 115, after they have been transferred to the volatile memory (RAM) 116.

Hereinafter, a description will be given of an image-taking operation using the mechanical shutter 102. Prior to the image-taking operation, assumption is made that the volatile memory 116 stores the required programs, control data, and correction data which have been transferred from the non-volatile memory 115 upon start of an operation by the system controller 114 such as upon turning on the power of the imaging apparatus. These programs and data are used when the system controller 114 controls the imaging apparatus. The processing for transferring additional programs and data from the non-volatile memory 115 to the volatile memory 116 is executed as required, and the system controller 114 uses data stored in the non-volatile memory 115 by directly reading it.

Firstly, the imaging optical system 101 drives the aperture and the lens in accordance with a control signal from the system controller 114, and images an object image of which the brightness has been appropriately set on the imaging element 103. Next, the mechanical shutter 102 shields the imaging element 103 from light in synchronism with the operation of the imaging element 103 such that an exposure time is set in accordance with the control signal from the system controller 114. At this time, when the imaging element 103 has an electronic shutter function, a required exposure time may also be ensured by using the imaging element 103 in conjunction with the mechanical shutter 102. The imaging element 103 is operated in accordance with a drive pulse generated by the timing signal generating circuit 106 which is controlled by the system controller 114. The imaging element 103 photoelectrically converts an object image into an electrical signal so as to output it as an analog image signal. The analog image signal output from the imaging element 103 is processed by the CDS circuit 104. In accordance with an operating pulse generated by the timing signal generating circuit 106 which is controlled by the system controller 114, the CDS circuit 104 removes a clock synchronization noise from the analog image signal, and the A/D converter 105 converts the resulting analog image signal into a digital image signal. Next, the signal processing circuit 108 which is controlled by the system controller 114 performs image processing such as color conversion, white balance, gamma correction, and the like, resolution conversion processing, image compression processing, and the like for a digital image signal. The image memory 109 temporarily stores a digital image signal during signal processing. Also, the image memory 109 stores data of a digital image signal subjected to signal processing. The image data subjected to signal processing by the signal processing circuit 108 and the image data stored in the image memory 109 are converted into data suitable for the recording medium 110 by the recording circuit 111. This data is data in a file system having, for example, a hierarchical structure. The format-converted data is recorded on the recording medium 110. In addition, the image data is subject to resolution conversion processing by the signal processing circuit 108, and then is converted into a signal (e.g., NTSC type analog signal) suitable for the image display device 112 by the display circuit 113. The image display device 112 displays an image in accordance with the converted signal.

The signal processing circuit 108 may also directly output a digital image signal to the image memory 109 or the recording circuit 111 without performing signal processing in accordance with a control signal from the system controller 114. When a request is made from the system controller 114, the signal processing circuit 108 outputs digital image signals generated in the course of signal processing and information relating to image data to the system controller 114. This information is information extracted from, for example, an image space frequency, an average of partial image data in the specified area, information such as the amount of data for compressed images. The recording circuit 111 replies information such as the type of the recording medium 110, the remaining capacity, and the like depending on the request from the system controller 114.

Next, a description will be given of a reproducing operation performed when image data is recorded on the recording medium 110. The recording circuit 111 reads image data from the recording medium 110 in accordance with a control signal from the system controller 114. When image data is a compressed image, the signal processing circuit 108 performs image expansion processing in accordance with the control signal from the system controller 114, and stores the expanded image in the image memory 109. The image data read from the image memory 109 is subject to resolution conversion processing by the signal processing circuit 108. Then, the display circuit 113 executes conversion processing for converting image data into a signal suitable for the image display device 112, and the image display device 112 displays an image.

Figure 2:
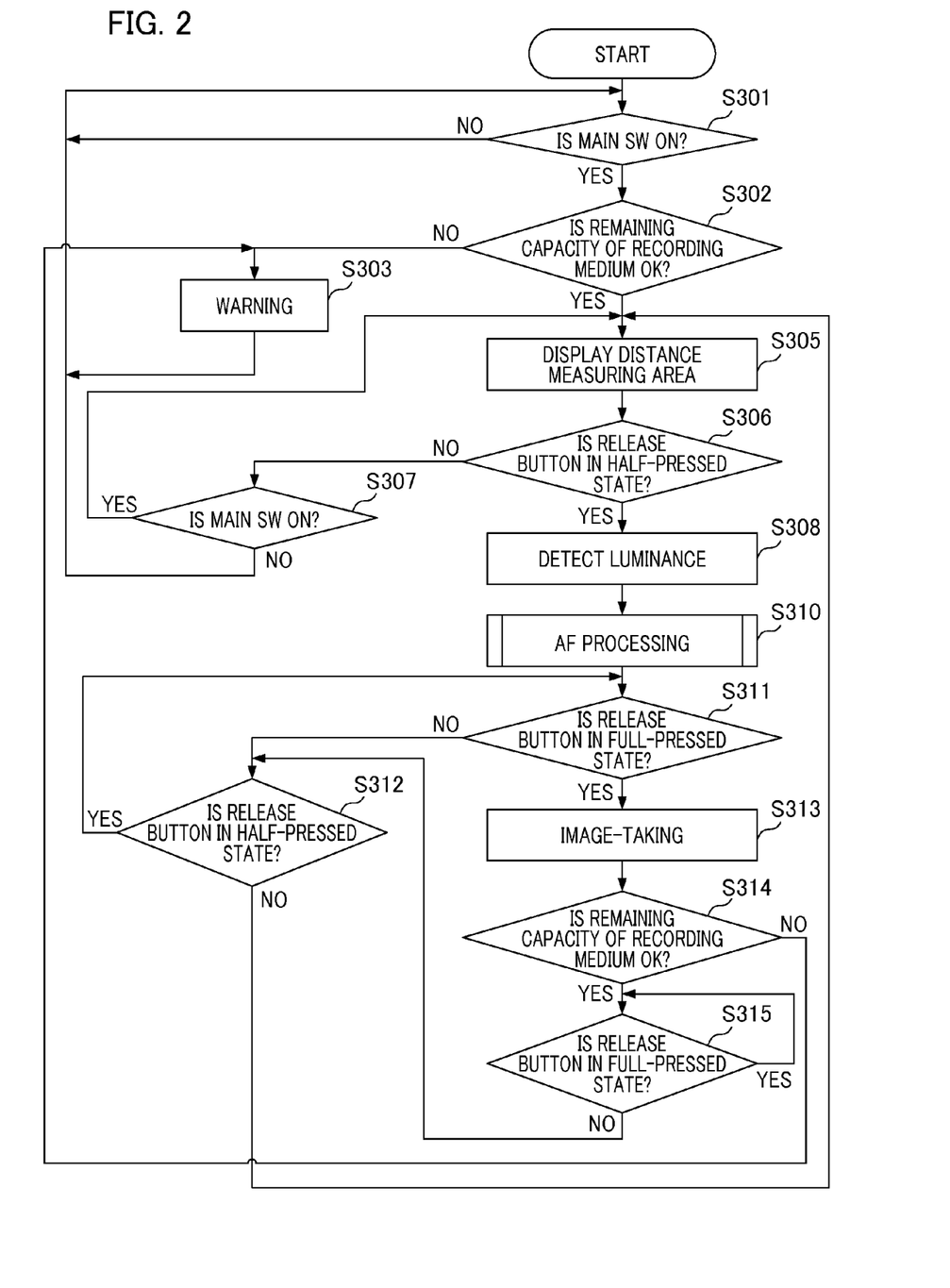
FIG. 2 is a flowchart illustrating the flow of processing performed by an imaging apparatus.

Hereinafter, a description will be given of the flow of processing which is common to the imaging apparatuses according to the embodiments of the present invention. FIG. 2 is a flowchart illustrating an example of processing. The processing is mainly performed by the system controller 114 (see FIG. 1).

Firstly, in step S301, the system controller 114 detects the state of a main switch (power switch) included in an operation unit (not shown). If the main switch is in the ON state, the process advances to step S302. If the main switch is in the OFF state, the determination in step S301 is repeated in a stand-by state. In step S302, the system controller 114 checks the remaining capacity of the recording medium 110 mounted on an attachment for the recording circuit 111. If the remaining capacity of the recording medium 110 is larger than the size of the captured image data defined from image quality settings and the like, the process advances to step S305. If otherwise, the process advances to step S303. In step S303, the system controller 114 provides a warning that the remaining capacity of the recording medium 110 is insufficient, and the process returns to step S301. In the warning processing, a message is displayed on the image display device 112 or a voice is output from a voice output unit (not shown) or both is performed.

In step S305, the system controller 114 controls to display a distance measuring area (focus detecting area) on the image display device 112. The captured image data is stored in the image memory 109 serving as a temporal storage unit, and display processing for generating a display image signal by the display circuit 113 so as to display the image signal on the image display device 112 is continuously executed. As a result of display processing, the distance measuring area set upon normal image-taking is displayed on a screen together with an image.

In step S306, the system controller 114 checks the operation state of a release button. If the release button is in the half-pressed state, the process advances to step S308. If otherwise, the process advances to step S307. The imaging apparatus of the present embodiment starts processing preceding image record processing, such as an auto focus adjustment operation (AF), an auto exposure control operation (AE), and the like in accordance with the half-pressing operation of the release button. In step S307, the system controller 114 checks the state of the main switch. If the main switch is in the ON state, the process returns to step S305. If the main switch is in the OFF state, the process returns to step S301.

In step S308, the system controller 114 detects the luminance of an object by acquiring data output from the A/D converter 105. Then, AF processing is executed in step S310. If the system controller 114 determines from the detection results in step S308 that the luminance of the object is lower than a predetermined value, the system controller 114 controls to emit light from a light source (not shown). In other words, AF auxiliary light is projected onto the object for a predetermined time so as to perform AF processing. Upon completion of the focusing operation by the movement of the focus lens, the system controller 114 checks in step S311 whether or not the release button is in the full-pressed state. If the release button is in the full-pressed state, the process advances to step S313. If otherwise, the process advances to step S312. If the release button is full-pressed, the imaging apparatus of the present embodiment starts image-taking processing (step S313). In step S312, the system controller 114 checks whether or not the release button is in the half-pressed state. If the release button is in the half-pressed state, the process returns to step S311. If otherwise, the process returns to step S305. In step S314, the system controller 114 determines the remaining capacity of the recording medium 110 as in step S302. If the system controller 114 determines that the remaining capacity of the recording medium 110 is sufficient for the next image-taking, the process advances to step S315. If otherwise, the process shifts to step S303. In step S315, the system controller 114 checks whether or not the release button is in the full-pressed state. If the release button is not in the full-pressed state, the process advances to step S312. If the release button is in the full-pressed state, the determination processing in step S315 is repeated.

It should be noted that, when an object corresponding to the center of the screen is focused on the imaging screen of the imaging optical system 101, focus may not be achieved on a peripheral portion of the image. In other words, focus may not be achieved on a second object at the same distance as the distance to a first object corresponding to an image to be imaged on the center of the screen or focus may be achieved on a third object at a different distance from the distance to the first object. In particular, the field curvature of the lens abruptly increases in the macro imaging area (close-up image taking), resulting in an increase in adverse effect of properties of an image-taking lens. Thus, the following countermeasure has been taken for an image-taking lens having such a property.

The relationship between the field curvature property of the image-taking lens depending on an imaging distance and the distance to an object is predicted from a lens design value. If the imaging distance is found, the amount of defocus at the peripheral portion of the screen due to field curvature is predictable. Thus, in the case of the imaging distance with a large field curvature, there has been employed a method for setting a predetermined offset amount using AF (AutoFocus) control so as to adjust an image-taking lens by intentionally fixing the lens in the out-of-focus state (the details of which will be described below with reference to FIG. 3C). In this manner, the amount of defocus is mitigated at the peripheral portion of the screen, whereas the best focus position is not obtained at the central portion of the screen. The imaging performance of the lens is high at the paraxial area as compared with the peripheral area, and thus, there is a room for an image quality artifact caused by defocusing to some extent, resulting in a reduction in adverse effect of defocusing. Note that the offset setting for the focus position is set from the amount of field curvature, which is predicted in advance from lens design, based on distance information to an object acquired upon AF. Consequently, an image in which the degree of imaging blur is improved at the periphery of the screen is obtained.

However, the method intentionally fixes the lens in the out-of-focus state for an object corresponding to the center of the screen, the imaging performance inherent to the imaging lens cannot be sufficiently exhibited depending on a condition in which F-number is bright upon image-taking. Furthermore, it is assumed that a planar object such as documents or a plane formed by a group of objects arrayed so as to be equi-spaced from the camera is captured with it facing the imaging element of the camera. When plane objects such as building walls or posters are actually captured, such objects do not necessarily face the camera. It is usual that such objects do not face the camera.

In the case of macro image-taking, an image may often be captured with a composition in which an object is not planar. For example, when macro image-taking is performed on insects, flowers, or the like with a composition in which a main object is located at a position corresponding to the center of the screen and the peripheral object is the background, the peripheral portion of the screen falls originally outside the depth of field, and thus, the degree of imaging blur may not be a problem for the purpose of expressing a photographer's creative intention. In such a case, a method for determining a focused position only by the balance between the central portion and the peripheral portion of the screen is not preferred.

When objects which are closer to the camera than a predetermined distance (e.g., substantially infinity) are captured, it is often expected that the array of the objects in the imaging screen is neither planar nor face the camera. Furthermore, when objects, which are away from the camera greater than a predetermined distance, such as a distant view are captured, the objects in the imaging screen are differently spaced from the camera, but it is almost equivalent that all objects are at infinity. In this case, since the array of such stereoscopic objects can be regarded as the array of all objects which are equi-spaced from the camera so as to face it, these stereoscopic objects need to be treated differently.

Hereinafter, a detailed description will be given of an imaging apparatus for implementing AF processing suitable for such a case and a method for controlling the same.

First Embodiment

Hereinafter, a description will be given of a first embodiment of the present invention. In the present embodiment, a description will be given of a case where field curvature readily occurs on the wide-angle end or the like of the zoom lens. A description will be given by taking an example in which, in an image-taking lens in which the field curvature becomes large toward the under direction at close-up distance, an offset amount is set to AF in accordance with the state of objects including a macro area upon image-taking at close-up distance so as to adjust a focus state at the optimum level.

Figure 3A:
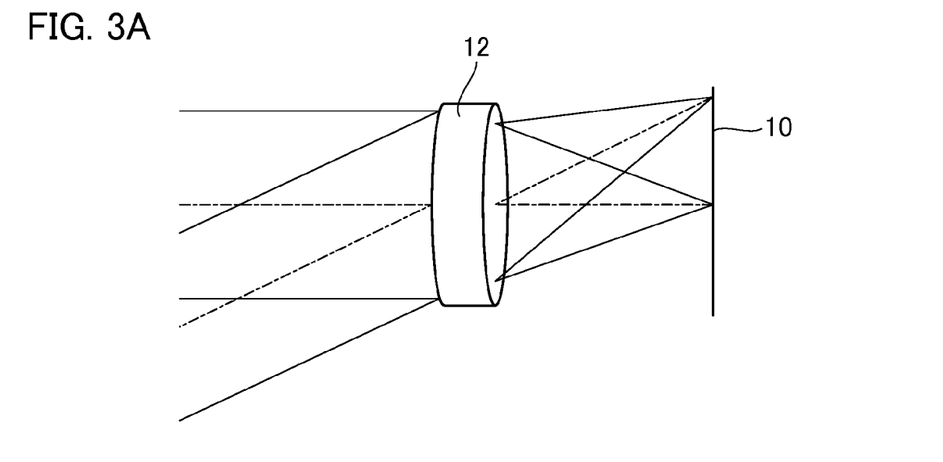
FIGS. 3A to 3C are explanatory diagrams illustrating the states of the image plane of an imaging unit.
Figure 3B:
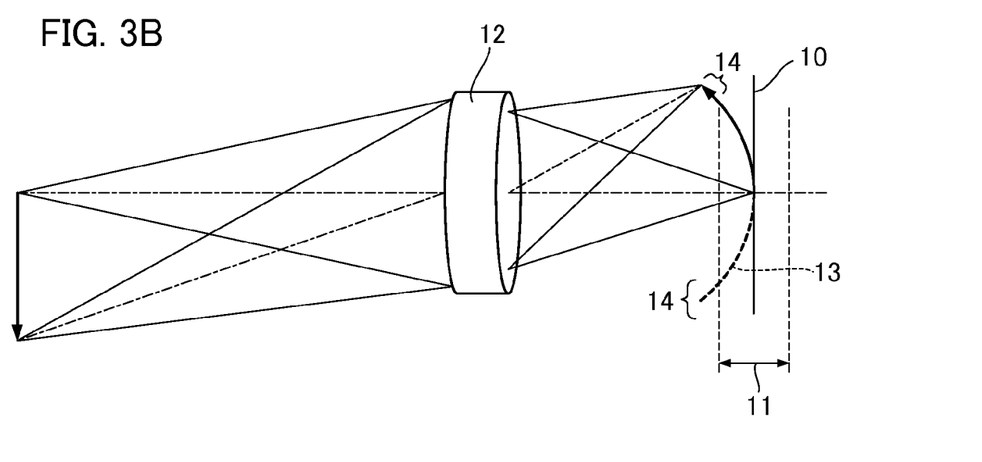

In the image-taking lens of the present embodiment, an image plane becomes substantially parallel to the imaging element regardless of the distances to the respective objects in the imaging screen in the range of imaging distance from about 10 meters to infinity, so-called, middle and far distance. FIG. 3A is a diagram illustrating the relationship between the image-taking lens 12 and a light-receiving plane 10 of the imaging element, where the light-receiving plane 10 is represented by a segment which is perpendicular to the optical axis. On the other hand, in the case where the imaging distance is about a few tens of mm, the image plane of the image-taking lens 12, on which the planer object facing the imaging element is imaged, indicates field curvature having greater curvature fallen largely toward the under side as shown in FIG. 3B. The left side in FIG. 3B is defined as "under side" and the right side in FIG. 3B is defined as "over side".

FIG. 3B is a diagram illustrating the state where an image is focused on the light-receiving plane 10 of the imaging element in the central portion of the imaging screen by the AF operation. For example, when a plane object such as paintings and calligraphic works is captured by an image-taking lens 12 at close-up distance, the captured image of paintings and calligraphic works becomes an aerial image having curvature toward the under side as shown in an image plane 13. The aerial image has an image portion which falls within the depth of focus range 11 of the imaging optical system and an image portion (see peripheral area 14) which falls outside the depth of focus range 11 at the periphery of the image plane 13. Since an image is curved toward the under side (toward the image-taking lens 12 side) at the peripheral area 14 of the screen, the amount of defocus of the image exceeds an acceptable level, that is, the image is blur.

Figure 3C:
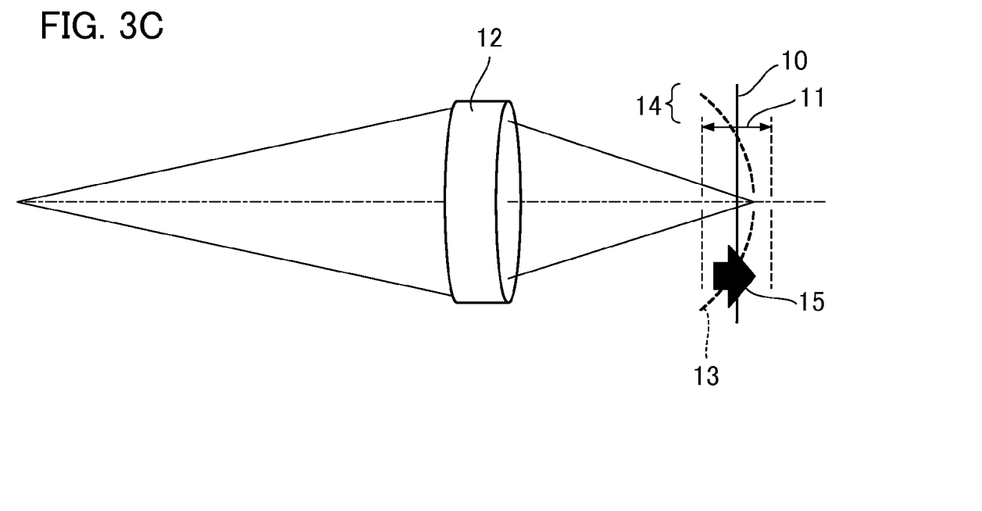

In such a case, an offset operation for offsetting the focus position of the center of the screen in a direction (the over side) opposite to the direction (the under side in FIG. 3B) toward which the image plane is fallen due to field curvature is performed. This is shown in FIG. 3C. In FIG. 3C, offset is denoted by arrow 15. Consequently, the image portion at the peripheral area 14 of the screen, which falls outside the depth of focus range 11 in FIG. 3B, falls within the depth of focus range 11, so that an image having a small blur at the peripheral area is obtained. However, the object also becomes out of focus at the central portion of the screen. Thus, the image portion at the central portion of the screen falls within the depth of focus range 11 but is not at the focus position at which the image-taking lens 12 can exhibit the best performance.

Figure 5:
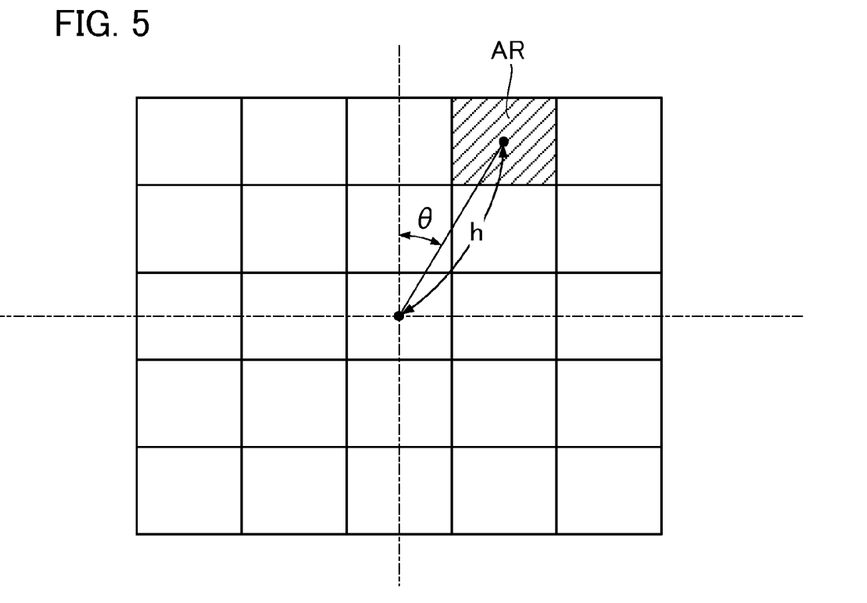
FIG. 5 is an explanatory diagram illustrating a divided area on an imaging element.

In the present embodiment, an imaging screen is divided into a plurality of areas (hereinafter referred to as "divided area") as shown in FIG. 5 so as to independently detect a focus position for each divided area. The example shown in FIG. 5 is the case where the screen corresponding to the imaging area of the imaging element 103 is divided into 25 areas of N*N (e.g., N=5). In general, the screen can be divided into areas of N*M. For example, it is assumed that the signal processing circuit 108 and the AF processing unit provided in the system controller 114 perform focus adjustment using a focus evaluating value by a contrast detection method. In this case, the focus evaluating value is calculated by extracting a high frequency component from an imaging signal processed by the signal processing circuit 108, and then the focus lens is controlled to be moved to a position at which the focus evaluating value reaches its peak. A focus evaluating value is acquired while controlling the absolute value of the amount of advance/retraction of the focus lens so as to bring the focus evaluating value into association with lens position information. In this manner, the focus position of the object at the divided areas on the screen can be determined. For the divided areas, an average of the focus evaluating values obtained within the respective divided areas can also be used as a representative value. In order to prevent the boundary of the object image from being affected by extending across a plurality of divided areas, a focus evaluating value at a further narrow area within the divided areas may also be treated as a representative value for the divided areas. Instead of using the contrast detection method, a defocus amount may also be calculated from an image deviation correlation-detected by a plurality of phase difference detecting elements arrayed on the imaging element so as to perform an AF operation (phase difference detection method AF).

Focus position information of the object at the respective divided areas on the screen is acquired as described above. The focus position information includes a focused position in the state where the object is in focus and the amount of deviation from the position. The image magnification calculation for the image-taking lens is executed based on the information, so that information (hereinafter referred to as "object distance") about the distance from the imaging apparatus to the object is obtained. However, when the object is captured at close-up distance, the influence of field curvature and image plane deformation is included in focus position information. For example, the image magnification at the image height is schematically found based on the object distance at each divided area, so that field curvature and image plane deformation, which correspond to the image magnification at the image height, are uniquely determined. As an example, there is a method for storing the amount of field curvature based on the design value of the image-taking lens and the amount of field deformation measured during the production of the image-taking lens in a predetermined storage unit as a data table together with an image height (radial direction), an object distance, and an azimuth angle direction.

The symbol "h" shown in FIG. 5 represents a distance (radial distance) from the zero point position of the center of the screen to the central position of any divided area AR. The azimuth angle θ represents an angle formed with respect to the reference axis in the vertical direction passing through the center of the screen. The object distance at the image height h and the azimuth angle θ corresponding to any divided area AR is determined based on the amount of advance/retraction of the image-taking lens. When the object distance is determined, the image magnification β(h, θ) is then determined. When field curvature corresponding thereto and asymmetrical image plane deformation are represented by $\Delta_{img}(h, \theta)$, the deviation $\Delta_{obj}(h, \theta)$ of the object distance is calculated by the following formula:

[Formula 1]

$$\Delta obj(h, \theta) = \frac{\Delta img(h, \theta)}{\beta(h, \theta)^2} \quad (1)$$

The component calculated from Formula (1) is subtracted and removed from the object distance by taking into consideration for the symbol identification, so that the exact object distance is determined. In other words, if distance determination is performed only by using image magnification on the optical axis without taking any consideration of a field curvature component and an image plane deformation component, the exact object distance cannot be obtained due to occurrence of errors such as an image plane deformation component. This will be described with reference to FIG. 4A.

Figure 4A:
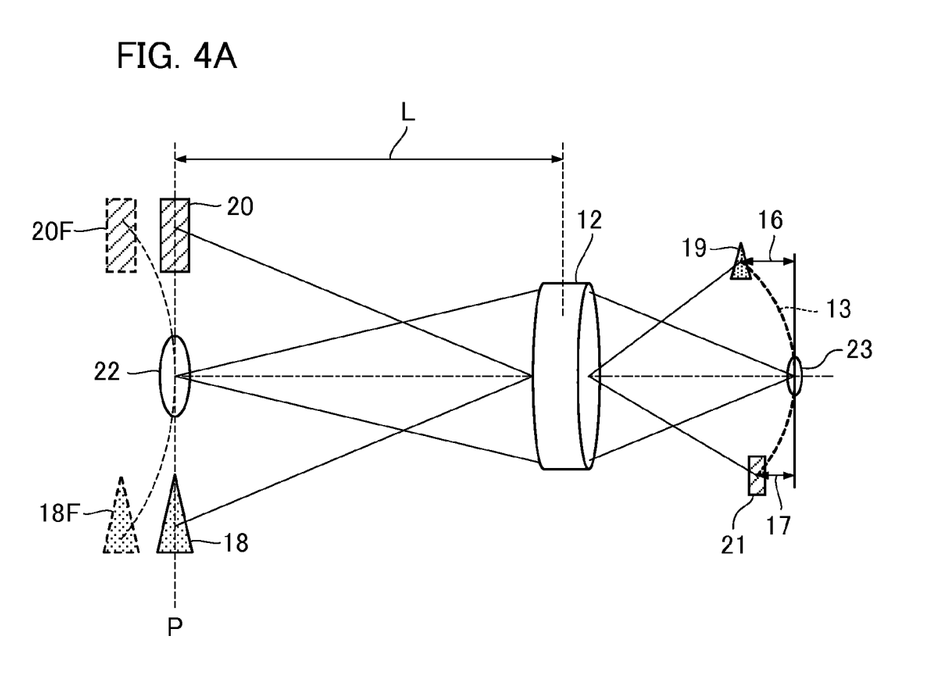
FIG. 4A is a diagram illustrating the positional relationship between the respective objects and an image plane in order to explain a first embodiment of the present invention.

FIG. 4A is a schematic diagram illustrating the relationship among a plurality of objects 18, 20, and 22, the image-taking lens 12, and a plurality of object images 19, 21, and 23. Assumption is made that the object 22 is located on the optical axis and other objects 18 and 20 are located on a plane (see reference symbol P) located at the object distance L from the image-taking lens 12. The image 19 corresponding to the object 18, the image 21 corresponding to the object 20, and the image 23 corresponding to the object 22 are shown. The design image plane 13 is exaggeratedly shown by the dotted lines at the object distance L. A field curvature toward the under side and asymmetrical image plane deformation caused by manufacturing error of the image-taking lens 12 simultaneously occur on the image plane 13. In the image height and the azimuth angle direction corresponding to the image 19, the amount of defocus indicated by a distance 16 occurs due to the composition of the field curvature component and the image plane deformation component. Likewise, the amount of defocus indicated by a distance 17 occurs on the image 21. Even if the image 19 and the image 21 have the same image height, the amount of defocus for the distance 16 and the amount of defocus for the distance 17 are different from each other due to the influence of asymmetrical image plane deformation. On the other hand, the objects 18 and 20 are actually present on the same plane. The same plane is a plane that is perpendicular to the optical axis and passes through the centers of the objects 18, 20, and 22 (see reference symbol P shown in FIG. 4A).

The detected amount of displacement of the image plane is also included in focus position information about the respective objects as described above, so that the object distance, i.e., a distance distribution of a group of objects is obtained based on the focus position information. However, the error component of the image plane included in the information needs to be removed in order to obtain correct information. In other words, when the object distance is simply calculated by using a uniform image magnification, the distances to imaginary objects 18F and 20F shown in FIG. 4A are calculated. Incorrect position determination is performed such that the object 20 is located at the position of the imaginary object 20F and the object 18 is located at the position of the imaginary object 18F. Accordingly, processing for subtracting and removing the composition value of the field curvature component and the image plane deformation component calculated using the above formula from the object distance is executed. In this manner, the exact object distance is determined. In the example shown in FIG. 4A, it is determined that both the objects 18 and 20 have the same object distance L. It is also found that these objects are located on the same plane and face the camera.

A description has been given by taking an example in which the image 23 on the optical axis and two images 19 and 21 at the peripheral portion of the screen are only shown as object images with reference to FIG. 4A. In practice, the same processing and determination as described above are executed for object images taken into the entire screen divided into 25 sections as shown in FIG. 5. The object distances for the respective divided areas on the screen include various error components such as errors associated with image magnification calculation, measurement errors caused by manufacturing error, and the like. Thus, if the distances to the respective objects located on the same plane are not strictly matched to one another but fall within a predetermined range, there should be no concern that the respective objects are substantially located on the same plane and face the camera.

The first array state in which the plurality of objects is arrayed such that the difference in distances between the plurality of objects and the imaging apparatus is equal to or less than a threshold value is the array state such that the respective objects are determined to be substantially located on the same plane and to face the camera. In this case, the system controller 114 performs the following processing under the first control.

Figure 4B:
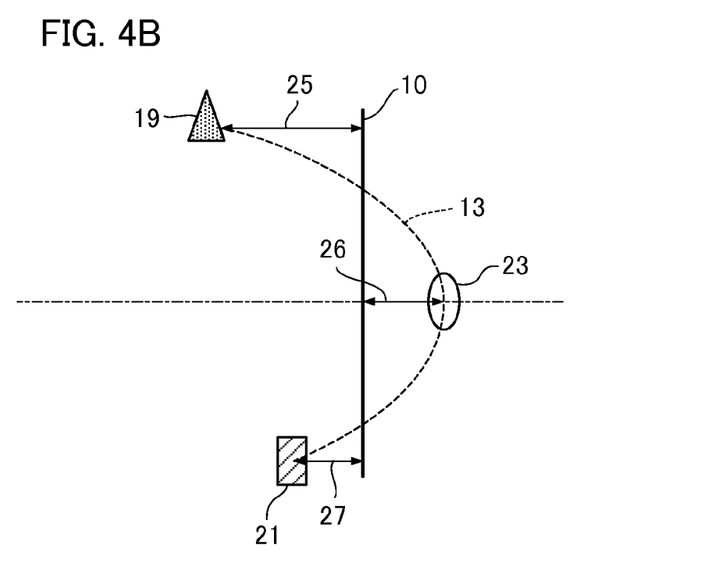
FIG. 4B is an explanatory diagram illustrating an image plane state in order to explain the first embodiment of the present invention.

For the sake of simplicity, a description will be given with reference to FIG. 4B. FIG. 4B shows the periphery of the light-receiving plane 10 of the imaging element shown in FIG. 4A. Processing for determining the relative position of the imaging element with respect to the object images in FIG. 4A is executed. In other words, when the focused positions of the object images are determined by AF processing, the amount of defocus of each object image is determined. In the example shown in FIG. 4B, the distance 25 from the light-receiving plane 10 indicates the amount of defocus of the image 19. Also, the distance 26 indicates the amount of defocus of the image 23, and the distance 27 indicates the amount of defocus of the image 21. Focus position adjustment is performed such that an absolute value of the sum of these amounts of defocus or the sum of the squares of these amounts of defocus is minimized.

Alternatively, weighting calculation processing is performed by multiplying the amount of defocus or the amount of deviation by a predetermined weighting coefficient Ki (i=1, 2, ... ) depending on the position of an object within the imaging screen. An exemplary reason for using the weighting coefficient Ki is to favor the central portion of the image. When a request for adjusting a focus state for giving a higher priority to the center of the image is made, weighting processing for largely estimating the amount of deviation in the area expected to be favored is performed. The reason for this processing is to preferentially reduce the amount of defocus in the area expected to be favored. Of course, an area in which the amount of defocus wants to be preferentially reduced may also be set to any location other than the center of the screen depending on the arrangement of weighting coefficients. When manufacturing error is suppressed to the extent under which an asymmetrical image plane deformation component caused by manufacturing error is negligible, only a field curvature component symmetrical with respect to the optical axis needs to be taken into account. In this case, the aforementioned $\Delta_{img}(h, \theta)$ is used by rotating it about the optical axis at one azimuth angle $\theta$, and thus, $\Delta_{img}(h, \theta)$ may be $\Delta_{img}(h)$ which is only a function of h.

It should be noted that the aforementioned processing is only effective when a plurality of objects is substantially located on the same plane and the array of the objects faces the imaging element. On the other hand, the case where the object distances for the respective divided areas on the screen are not substantially equal to each other needs to be dealt with by taking into account the field curvature component and the image plane deformation component. Such circumstances may be separated into two cases: the first case where a plurality of objects is not present on the same plane and the second case where a plurality of objects is present on the same plane but does not face the camera. Hereinafter, a description will be given of the second array state in which a plurality of objects is arrayed such that the difference in distances between the plurality of objects and the imaging apparatus exceeds a threshold value with reference to FIG. 6.

Figure 6:
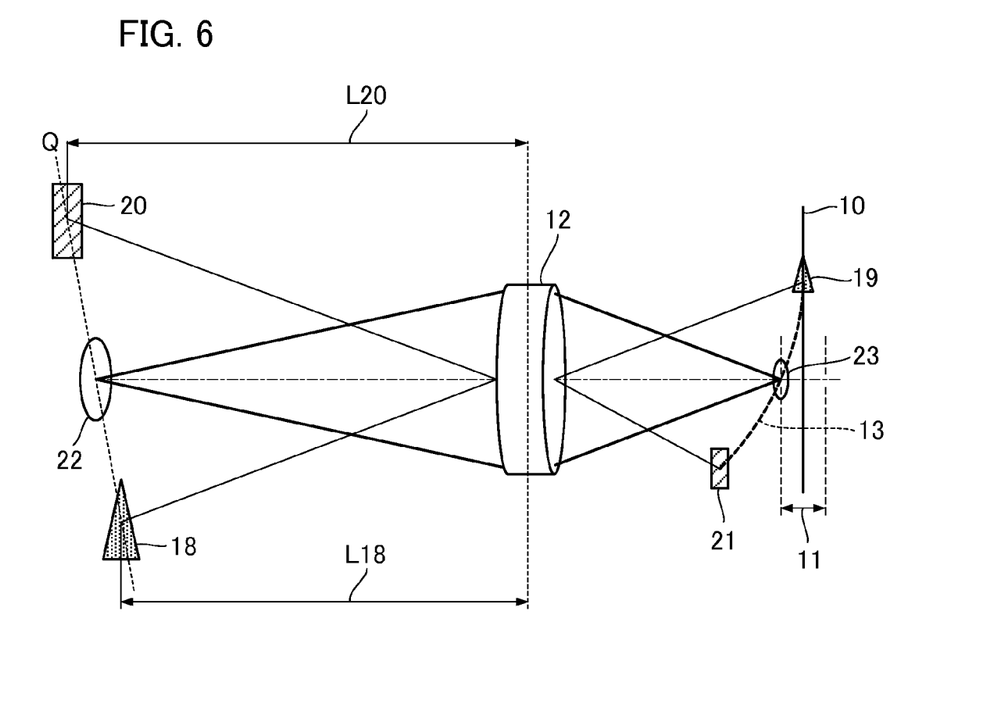
FIG. 6 is an explanatory diagram illustrating a plurality of objects and an image plane state.

FIG. 6 shows the second case under the assumption that the objects 18 and 20 are located on the same plane Q as that of the object 22 located on the optical axis. Note that the plane Q is a plane that is angled with respect to the optical axis and the respective objects do not face the camera. In FIG. 6, the distance L18 from the image-taking lens 12 to the object 18 and the distance L20 from the image-taking lens 12 to the object 20 are shown. As in the case shown in FIG. 4A, the image-taking lens 12 has field curvature toward the under side. Processing for calculating object distances by removing a field curvature component and an asymmetrical image plane deformation component caused by manufacturing error is performed. Consequently, the object distances L18 and L20 are not equal to each other. Note that it can be determined whether or not the respective objects are located on the same plane which does not face the camera based on the image heights and object distances of the object images. In this case, there is no meaning to perform focus position adjustment such that an absolute value of the sum of these amounts of defocus for the respective objects or the sum of the squares of these amounts of defocus is minimized. Even if the focus position adjustment processing is executed, the focus is only set at the intermediary of the opposite terminal areas which are out of focus in the divided areas within the imaging screen. In other words, all of the areas or many more areas within the screen are not necessarily fallen within the depth of focus range 11. Even if the image of an object to which focusing is desired to be made is present on any one of the divided areas, it has no meaning to adjust focusing on the entire screen on average by largely shifting the image-taking lens 12 in an out-of-focus direction from that position.

Thus, in such a case, the system controller 114 performs processing for focusing the lens on an object to which focusing is desired to be made with highest priority under the second control. In other words, processing for focusing on an image in the area as a focusing reference area which is any one of divided areas within the screen is performed. The focusing reference area is an area where the main object on an intended purpose of image-taking is present. The simplest method for determining the area is to fix the area at the center of the screen. In other words, the focusing reference area is set to an area including the center of the imaging screen. This is because the photographer typically operates the camera such that the main object is located at the center of the screen upon determining the composition desired to be captured. Another method for determining the area is to be arbitrarily specified by the photographer. For example, in the camera or the like provided with a touch panel on a display screen such as a liquid crystal view finder, the photographer selects an image of the main object imaged on the display screen via his hand or his finger so as to determine the focusing reference area. When the camera automatically detects and determines a feature part such as a face by object automatic detection processing, an area (face area) including an image of the part is determined as the focusing reference area. When the object 18 is the main object in the example shown in FIG. 6, the image 19 of the object 18 is in focus on the light-receiving plane 10 of the imaging element. Thus, other objects 20 and 22 are out of focus, and thus, the images 21 and 23 of the objects 20 and 22, respectively, are blur images because the images 21 and 23 are located near the depth of focus or outside the depth of focus range. The aforementioned processing is also applicable to the case where the objects to be imaged onto the divided areas within the screen are not located on the same plane.

Figure 7:
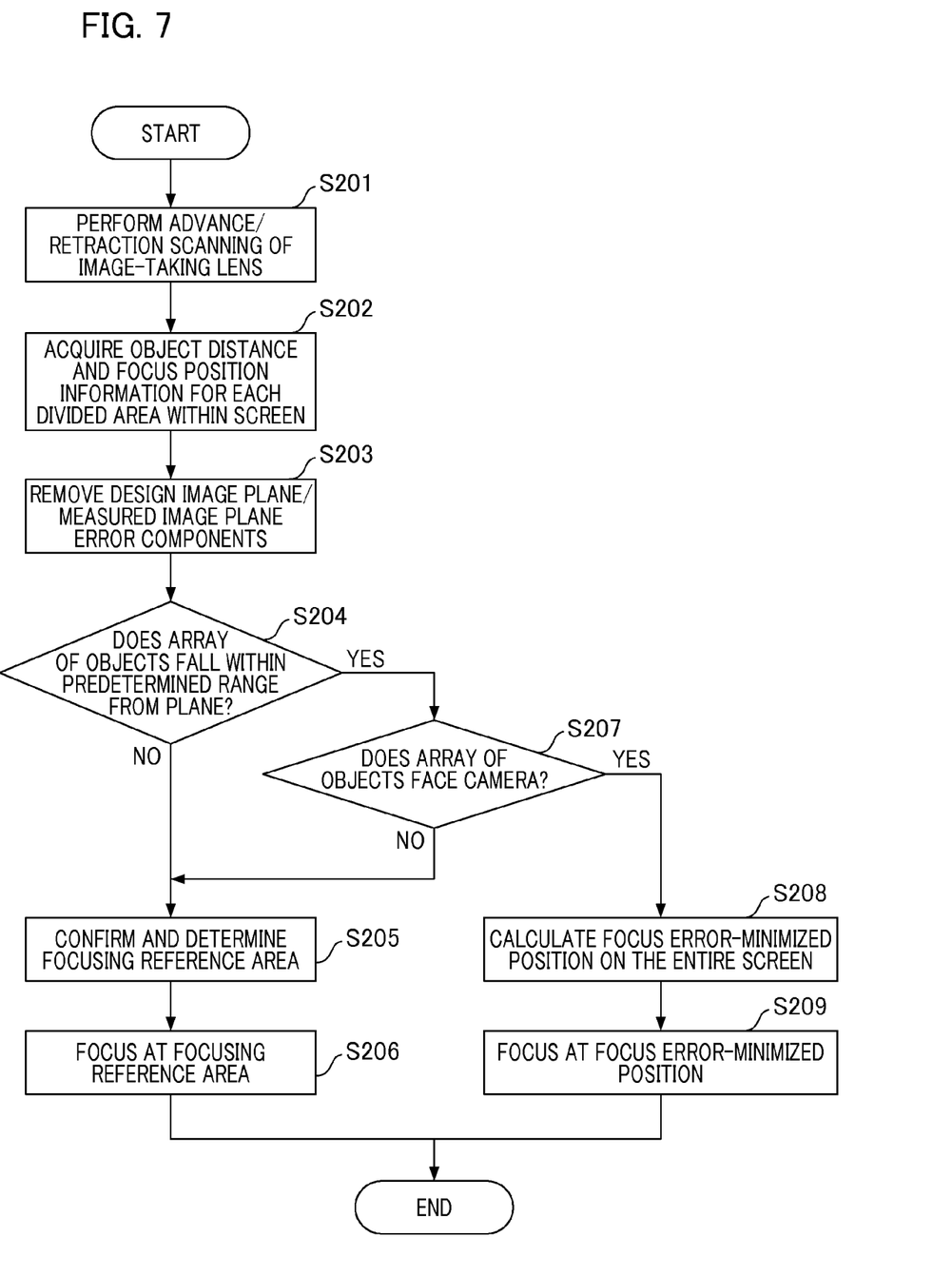
FIG. 7 is a flowchart illustrating the flow of focus adjustment processing.

Next, a description will be given of the flow of focus adjustment processing according to the present embodiment with reference to the flowchart shown in FIG. 7. The following processing is realized in accordance with a control program executed by the system controller 114.

In step S201, the system controller 114 controls an advance/retraction operation of the image-taking lens. The system controller 114 outputs a control signal to the drive circuit 107 so as to cause it to control driving of the movable lens of the imaging optical system 101. Next, in step S202, the system controller 114 acquires an object distance and focus position information for each of the divided areas (see AR shown in FIG. 5) within the imaging screen. In the case of a contrast detection method, the system controller 114 executes AF processing based on a focus evaluating value acquired from the signal processing circuit 108. In the case of a pupil division-type phase difference detection method, the system controller 114 executes AF processing by calculating the amount of defocus based on an image signal acquired from the phase difference detecting element of the imaging element 103. It should be noted that the object distance for each divided area, which has been acquired in step S202, includes the aforementioned error component. Thus, in step S203, processing for correcting the object distance by calculating the deviation $\Delta_{obj}(h, \theta)$ of the object distance using Formula (1) is performed. In this processing, a field curvature component and an asymmetrical image plane deformation component caused by manufacturing error are removed. In this manner, the correct array state of objects can be grasped together with distance information to the objects to be imaged onto the divided areas within the screen and image plane information. The array state includes a state where a plurality of objects is located on the same plane P as exemplified in FIG. 4A or a state where a plurality of objects is located on the same plane Q but does not face the camera as exemplified in FIG. 6.

Next, in step S204, the system controller 114 determines the array state of objects. It is determined from the processing whether or not a plurality of objects falls within a predetermined range from the same plane corresponding to object distances. The object distances are corrected distance information from which the error component has been removed in step S203. The predetermined range is defined by a threshold value predetermined as a determination reference value. For example, when an image plane in which the focused position has been adjusted by using distance information about distances to a plurality of objects respectively corresponding to the divided areas shown in FIG. 5 falls within the depth of focus range, it may be considered that the object distances to the respective objects are equal. If it is determined in step S204 that a plurality of objects falls within a predetermined range from the same plane corresponding to the object distances, the process advances to step S207. If it is determined in step S204 that a plurality of objects does not fall within a predetermined range from the same plane corresponding to the object distances, the process advances to step S205.

In step S207, the system controller 114 performs facing determination. If the array of a plurality of objects faces the camera as a result of determination, the process advances to step S208. If otherwise, the process advances to step S205.

In step S205, the system controller 114 performs confirmation and determination processing for the focusing reference area. The confirmation processing is, for example, processing for prompting the photographer to confirm an image area corresponding to the position of the main object on an intended purpose of image-taking by displaying the image area on the screen. The determination processing is processing for selecting an area in accordance with an operation instruction given by the photographer or processing for automatically selecting the face area or the like of an object if the photographer does not provide an operation instruction over a specific time period. In step S206, the system controller 114 adjusts a focus position in accordance with the area determined as a focusing reference.

On the other hand, in step S208, the system controller 114 calculates an absolute value of the sum of these amounts of defocus for the respective divided areas on the imaging screen or the sum of the squares of these amounts of defocus. Next, in step S209, the system controller 114 performs focus position adjustment such that the calculated value is minimized. At this time, weighting calculation may also be performed using the weighting coefficient. After the processing in steps S206 and S209, a series of the aforementioned processing ends.

According to the present embodiment, exact focus position information and information about the array state of objects can be acquired by removing the error component caused by field curvature and image plane deformation from distance information to the respective objects to be captured at the divided areas on the imaging screen. In this manner, an image with the optimum focused state for the respective objects can be captured based on information obtained by removing an error component corresponding to the position of the image plane from distance information to the respective objects to be captured on the imaging screen.

While, in the present embodiment, a description has been given of the case where field curvature occurs toward the under side, the same is also applicable to the case where field curvature occurs toward the over side or the case where field curvature varies toward the over side or the under side depending on the image height. The same is also applicable to embodiments to be described below.

Second Embodiment

Next, a description will be given of a second embodiment of the present invention. In the second embodiment, a description will be given by taking an example in which a telephoto end of the zoom lens is used upon capturing an image of a distant object such as a distant view. A description will be mainly given of the differences from the first embodiment in order to avoid a redundant description. This also applies to embodiments to be described below.

Figure 8A:
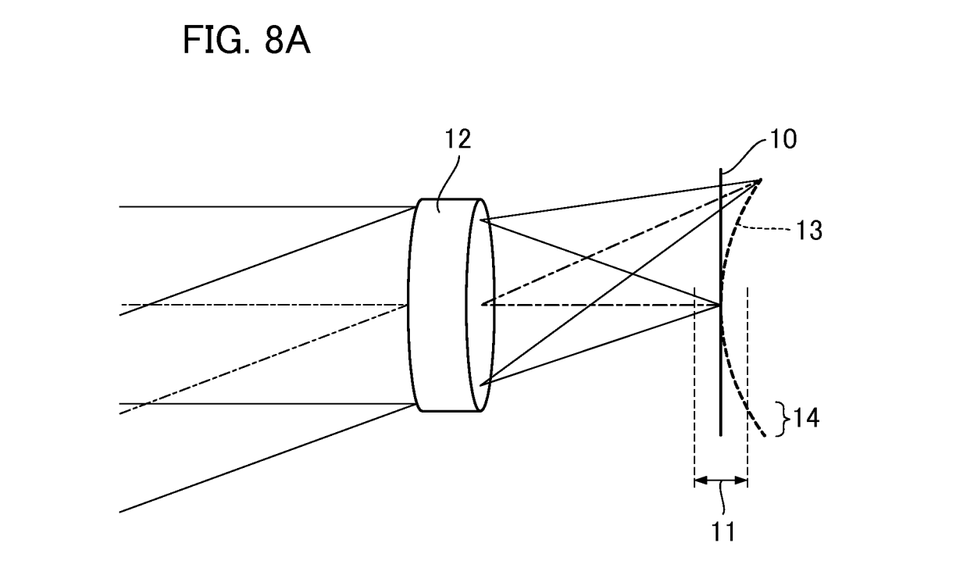
FIGS. 8A and 8B are explanatory diagrams illustrating image plane states in order to explain a second embodiment of the present invention.

FIG. 8A is a diagram illustrating an example in which field curvature occurs toward the over side at infinity in the telephoto end due to a limitation on lens design. In FIG. 8A, an image at the central portion of the screen is focused on the light-receiving plane 10 of the imaging element 103 by AF processing. In the image-taking lens 12, field curvature occurs toward the over side at a far distance from about 10 meter to infinity. The depth of focus range of the imaging optical system 101 is depicted as a distance 11. At this time, the peripheral portion of the imaging screen falls outside the depth of focus range 11 on the image plane 13 to be captured. As shown in the portion of the peripheral area 14 on the screen, the amount of defocus exceeds an acceptable level at the end of the screen, and thus, an image obtained in this case is a blur image.

Figure 8B:
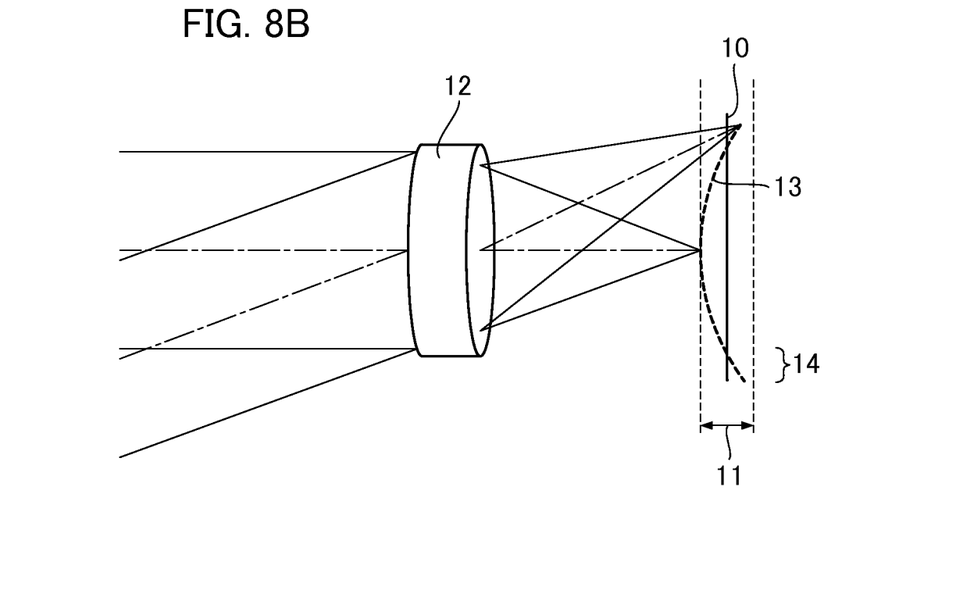

The difference from the first embodiment that field curvature occurs on a far distance side. Since a distance to each objects exceeds a specific distance, there should be no concern that the distance to each of all the objects within the image plane is substantially equal to infinity. Thus, it may be determined that the respective objects are located on the same plane and face the camera. When the imaging distance at each divided area within the screen satisfies the above condition, local defocusing distribution appears on the screen due to the influence of field curvature and asymmetrical image plane deformation caused by manufacturing error of the image-taking lens 12 regardless of the difference in distances between each individual object and the camera. As a countermeasure, focus position adjustment is performed such that an absolute value of the sum of the amounts of defocus, i.e., the sum of deviations or the sum of the squares of deviations from the focused state is minimized, so that such an influence can be mitigated. The focus state after adjustment is shown in FIG. 8B. In the example shown in FIG. 8B, the peripheral area 14 falls within the depth of focus range 11.

The same processing as described above may also be performed after a predetermined weighting coefficient corresponding to the position of an object within the imaging screen is multiplied by the amount of deviation. The reason for performing calculation processing using a weighting coefficient is as has been described in the first embodiment. When manufacturing error is suppressed to the extent under which an asymmetrical image plane deformation component caused by manufacturing error is negligible, only a field curvature component symmetrical with respect to the optical axis needs to be taken into account.

Figure 9:
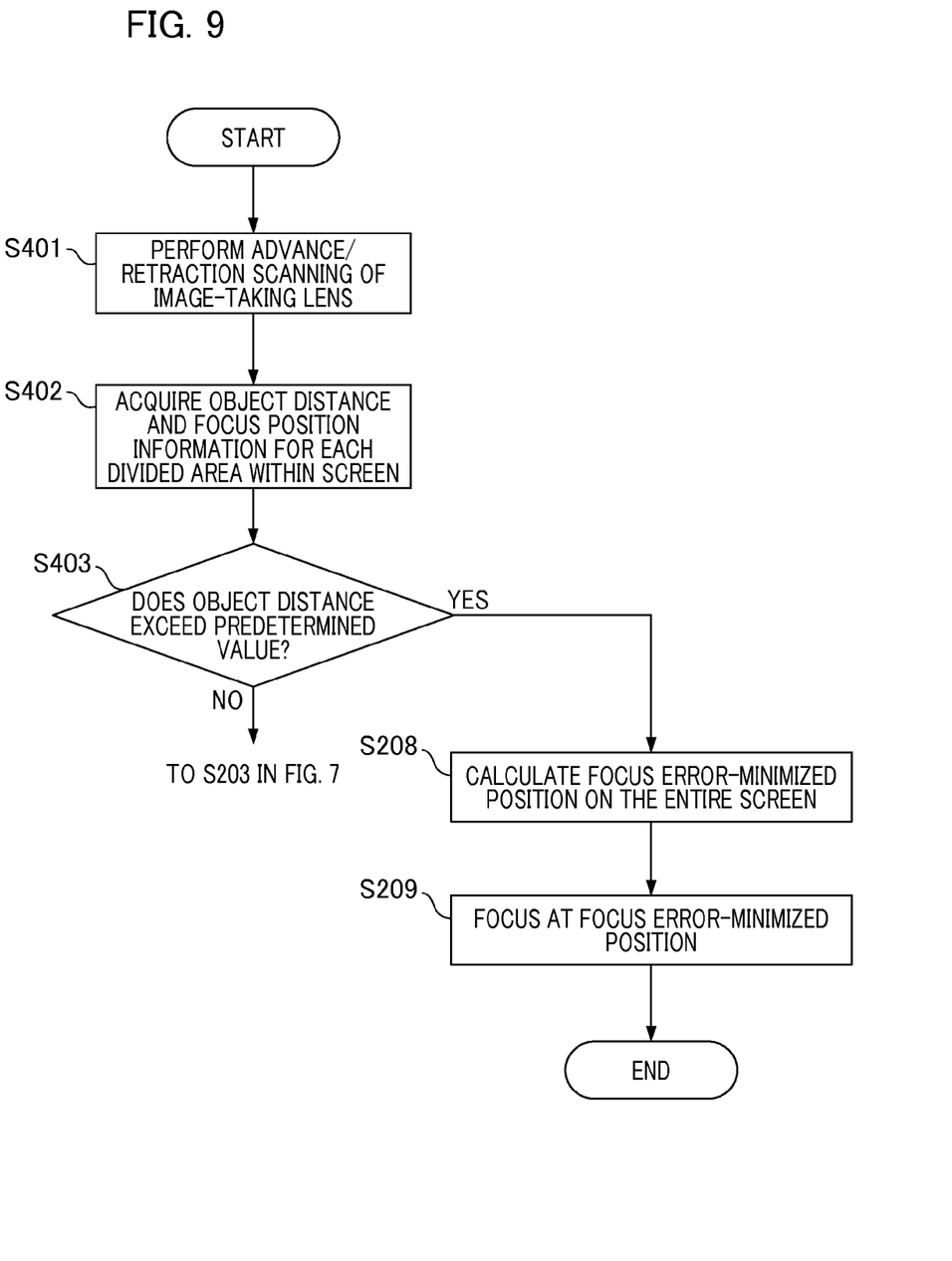
FIG. 9 is a flowchart illustrating the flow of processing performed by an imaging apparatus according to a second embodiment of the present invention.

FIG. 9 is a flowchart partially illustrating the flow of processing according to the present embodiment. The processing in steps S401 and step S402 is the same as that in steps S201 and step S202 shown in FIG. 7. The processing in steps S208 and S209 has already been described with reference to FIG. 7. Thus, a description will be given of determination processing in step S403.

In step S403, the system controller 114 determines whether or not the object distance is equivalent to infinity, that is, compares the object distance at each divided area with a predetermined distance. If the object distance is equal to or less than a predetermined distance, the process advances to step S203 in FIG. 7. Furthermore, the processing in steps S204 to S209 is executed. The predetermined distance is a predetermined determination reference value (threshold value), and is referenced by the system controller 114 from a memory or the like. If it is determined in step S403 that the object distance at each divided area exceeds a predetermined distance, the process advances to step S208. The same processing as that performed in the case of close-up distance described in the first embodiment is executed. In other words, if the object distance can be treated to be equivalent to infinity, these objects are treated as the array of objects located on the plane facing the camera regardless of the perspective relationship between the respective objects corresponding to the divided areas. Then, the processing in steps S208 and S209 is executed.

According to the present embodiment, appropriate image data can be generated by adjusting a focused position to the respective objects located at a far distance from the imaging apparatus.

Third Embodiment

Next, a description will be given of a third embodiment of the present invention. The imaging apparatus of the present embodiment determines whether or not a plurality of objects corresponding to the respective divided areas on the screen is arrayed on the same plane using the above method. If the system controller 114 determines that a plurality of objects is arrayed on the same plane but does not face the imaging apparatus, the system controller 114 determines that the plurality of objects is a plane object such as paintings and calligraphic works and performs automatic trapezoidal correction. Trapezoidal correction (trapezoidal distortion correction) is to correct trapezoidal distortion in order to recover a trapezoidal shape which is originally a quadrangle (rectangular, square) but is deformed by trapezoidal distortion back to a quadrangle shape.

For example, when the plane objects are to be captured, the description content of the plane objects needs to be read correctly. In such a case, the sole purpose can be correctly achieved by correcting trapezoidal distortion using automatic determination even if the plane objects are captured in the state where the plane objects do not face the imaging apparatus. Although it is preferable that the plane objects are captured in the state where the plane objects face the camera, an advantage lies in the fact that the imaging apparatus can respond automatically even if the plane objects are captured by simply defining a composition thereof. It should be noted that settings may also be selected so as not to use the function because an oblique image taking may also be performed for the purpose of expressing a photographer's creative intention instead of the purpose of image-taking for the plane objects.

According to the present embodiment, appropriate image data can be generated when the oblique image taking is performed for a plane object.

Fourth Embodiment

Next, a description will be given of a fourth embodiment of the present invention. The imaging apparatus of the present embodiment changes exposure conditions if it is determined that a plurality of objects corresponding to the respective divided areas on the screen is arrayed on the same plane and faces the imaging apparatus using the above method. In this case, the system controller 114 controls to stop down the aperture by changing the aperture value of the imaging optical system 101 to the extent that does not significantly affect the exposure conditions. Consequently, the depth of focus becomes deep at the periphery of the screen, the influence of field curvature and image plane deformation may be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-079064, filed on Apr. 5, 2013, which is hereby incorporated by reference herein in its entirety.

What is claimed is:

1. An imaging apparatus using an imaging optical system having an amount of field curvature depending on an imaging distance, the imaging apparatus comprising:
   an image sensor configured to image an object via the imaging optical system;
   a storage configured to store data of the amount of field curvature corresponding to the imaging distance;
   a processor configured to:
   calculate distance information to an object for each of a plurality of divided areas of an imaging screen corresponding to an imaging area of the image sensor; and
   acquire the data of the amount of field curvature corresponding to the imaging distance from the storage, remove the data from calculated distance information, correct distance information to an object for each of the divided areas and determine a focused state based on a defocus amount to thereby cause a driver for driving a focus lens to control the movement of the focus lens for constituting the imaging optical system,
   wherein the processor performs first control that controls movement of the focus lens by calculating a focused position from the defocus amount calculated for each of the divided areas when a plurality of objects is in an array state in which the difference in distances between the plurality of objects respectively corresponding to the divided areas and the imaging apparatus is equal to or less than a threshold value, and the processor performs second control that controls movement of the focus lens by calculating a focused position from the defocus amount calculated for an area selected from the divided areas when the plurality of objects respectively corresponding to the divided areas is not in the array state.

2. The imaging apparatus according to claim 1, wherein the storage stores data of an amount of field deformation which depends on manufacturing error in a lens constituting the imaging optical system and includes an asymmetrical component, and the processor acquires the data of the amount of field deformation from the storage and removes the data from the calculated distance information to thereby correct distance information to an object for each of the divided areas.

3. The imaging apparatus according to claim 2, wherein, in the first control, the processor controls movement of the focus lens by calculating the focused position at which an absolute value of the sum of the defocus amounts respectively obtained for the divided areas or the sum of the squares of the defocus amounts is minimized.

4. The imaging apparatus according to claim 1, wherein, in the first control, the processor controls movement of the focus lens by calculating the focused position at which an absolute value of the sum of the defocus amounts respectively obtained for the divided areas or the sum of the squares of the defocus amounts is minimized.

5. The imaging apparatus according to claim 1, wherein, in the second control, the processor determines an area corresponding to a main object from among the divided areas and controls movement of the focus lens by taking the area as a focusing reference to thereby perform a preferential focusing operation for the main object.

6. The imaging apparatus according to claim 5, wherein the area corresponding to the main object is the divided area including a central portion of the imaging screen, an area selected from the plurality of divided areas, or an area including a face area of the main object from among the plurality of divided areas.

7. The imaging apparatus according to claim 1, wherein, when a distance to the plurality of objects respectively corresponding to the divided areas is greater than a threshold value, the processor considers that the distances to the respective objects are equal, determines that the respective objects are arrayed so as to face the imaging apparatus, and corrects distance information to the respective objects by acquiring the data of the amount of field curvature corresponding to infinity from the storage to thereby perform the first control.

8. The imaging apparatus according to claim 7, wherein, when an image plane in which the focused position has been adjusted by using distance information to the plurality of objects respectively corresponding to the divided areas falls within the depth of focus, the processor determines that the distances to the respective objects are equal.

9. The imaging apparatus according to claim 1, wherein, when the processor determines that the plurality of objects respectively corresponding to the divided areas is arrayed on the same plane and does not face the imaging apparatus, the processor performs trapezoidal distortion correction for an image captured by the image sensor.

10. The imaging apparatus according to claim 1, wherein, when the processor determines that the plurality of objects respectively corresponding to the divided areas is arrayed on the same plane and faces the imaging apparatus, the processor sets the depth of field deeply by aperture control.

11. The imaging apparatus according to claim 1, wherein, in the first control, the processor multiplies the defocus amount calculated for each of the divided areas by a weighting coefficient to thereby calculate the focused position at which an absolute value of the sum of deviations from the focused state or the sum of the squares of the defocus amounts is minimized.

12. A control method to be executed by an imaging apparatus that comprises: an imaging optical system having an amount of field curvature depending on an imaging distance; an image sensor configured to image an object via the imaging optical system; a storage configured to store data of the amount of field curvature corresponding to the imaging distance; and a processor configured to calculate distance information to an object for each of a plurality of divided areas of an imaging screen corresponding to an imaging area of the image sensor, and to acquire the data of the amount of field curvature corresponding to the imaging distance from the storage, remove the data from calculated distance information, correct distance information to an object for each of the divided areas and determine a focused state based on a defocus amount to thereby cause a driver for driving a focus lens to control the movement of the focus lens for constituting the imaging optical system, wherein the control method comprises:

determining whether or not a plurality of objects are in an array state in which the difference in distances between the plurality of objects respectively corresponding to the divided areas and the imaging apparatus is equal to or less than a threshold value;

performing first control that controls movement of the focus lens by calculating a focused position from the defocus amount calculated for each of the divided areas when it is determined that the plurality of objects are in the array state; and performing second control that controls movement of the focus lens by calculating a focused position from the defocus amount calculated for an area selected from the divided areas when it is determined that the plurality of objects respectively corresponding to the divided areas are not in the array state.

* * * * *